United States Patent [19]

Noda

[11] Patent Number: 4,959,673

[45] Date of Patent: Sep. 25, 1990

[54] INK JET RECORDING APPARATUS

[75] Inventor: Atsushi Noda, Kawasaki, Japan

[73] Assignee: Canon Kabushiki Kaisha, Tokyo, Japan

[21] Appl. No.: 418,960

[22] Filed: Oct. 10, 1989

Related U.S. Application Data

[63] Continuation of Ser. No. 291,763, Dec. 29, 1988, abandoned.

[30] Foreign Application Priority Data

Dec. 29, 1987 [JP] Japan ................................ 62-335367

[51] Int. Cl.[5] ............................................ G01D 15/18

[52] U.S. Cl. ............................................ 346/140 R

[58] Field of Search ............... 346/75, 140 IJ, 140 PD

[56] References Cited

U.S. PATENT DOCUMENTS

| | | | |
|---|---|---|---|
| 4,045,802 | 8/1977 | Fukuzawa et al. | 346/140 R |
| 4,306,245 | 12/1981 | Kasugayama et al. | 346/140 R |
| 4,364,065 | 12/1982 | Yamamori et al. | 346/140 R |
| 4,745,414 | 5/1988 | Okamura et al. | 346/140 R |

FOREIGN PATENT DOCUMENTS

| | | |
|---|---|---|
| 3736916 | 9/1988 | Fed. Rep. of Germany . |
| 3611666 | 10/1988 | Fed. Rep. of Germany . |
| 2463005 | 2/1981 | France . |
| 59-45163 | 1/1984 | Japan . |
| 59-14964 | 8/1984 | Japan . |
| 61-5647 | 1/1986 | Japan . |

*Primary Examiner*—George H. Miller, Jr.

*Attorney, Agent, or Firm*—Fitzpatrick, Cella, Harper & Scinto

[57] ABSTRACT

An ink jet recording apparatus comprises a recording head having a discharge port for discharging ink therethrough and a cleaning member having a cleaning blade capable of contacting the vicinity of the discharge port. Cleaning of the vicinity is performed by the relative movement of the cleaning blade and the recording head. The cleaning member has a member for changing a cleaning force of the cleaning blade to the vicinity in response to a direction of the movement when cleaning is performed.

32 Claims, 5 Drawing Sheets

INK JET RECORDING APPARATUS

This application is a continuation of application Ser. No. 291,763, filed Dec. 29, 1988, now abandoned.

BACKGROUND OF THE INVENTION

1. Field of the Invention

The present invention relates to an ink jet recording apparatus, and more particularly to an ink jet recording apparatus equipped with cleaning means for eliminating ink, water droplets etc. deposited on the ink discharging face of the recording head.

2. Related Background Art

In a ink jet recording apparatus, there may result dewing in the vicinity of the ink discharging apertures, for example on a surface in which said apertures are provided, depending on the temperature and other conditions of the recording head and surrounding atmosphere, due to a high moisture condition generated by the evaporation of the water contained in the ink deposited on the recording medium;

Also the ink discharging surface may be wetted by the ink bouncing back from recording medium.

Such dewing or wetting phenomenon becomes more marked in case a fixing heater is employed for accelerating the fixation of the recorded image to the recording medium, or in case of a high dot duty ratio.

Such dewing or wetting causes uneven deposition of the water droplets on the ink discharging surface, thus unevenly pulling the discharged ink droplets and giving rise to fluctuations in the discharging direction, discharging speed or particle size thereof, thereby eventually deteriorating the quality of the obtained image. Also the wetting of the ink discharging surface facilitates deposition of paper powder or dust, thus deteriorating the quality of the recorded image.

As a countermeasure for such phenomenon, there has been conducted cleaning of the ink discharging surface at suitable timing, in order to remove such dewing or wetting. A wiping mechanism utilizing a blade as the cleaning means is disclosed in the U.S. Pat. No. 4,364,065.

FIGS. 1A to 1C are schematic plan views of a conventional example of wiping ,means utilizing a blade member composed of silicone rubber or butyl rubber, suitable as the cleaning means.

In these drawings there is shown a recording head 20 positioned opposite to the recording surface of a recording medium 33, such as paper sheet or plastic sheet, and provided with nozzles for ink discharge. A carriage 16 supporting said recording head 20 is connected to a part of a driving belt 18 and is slidably supported by mutually parallel guide shafts 19A and 19B so that the recording head 20 can reciprocate over the entire width of the recording medium 33.

A discharge recovery device 26 for the recording head is provided at a position opposite to an end of the moving path of the recording head 20, for example the home position thereof. The discharge recovery device 26 is activated by an unrepresented motor and a transmission mechanism, thereby capping the recording head 20. In combination with the capping of the recording head 20 with a cap member 26A of said discharge recovery device 26, there is conducted ink suction by suitable suction means provided in the discharge recovery device 26, or ink pressurizing by suitable pressurizing means provided in the ink supply path to the recording head 20, thereby forcedly eliminating viscous ink from the discharge apertures, thus achieving discharge recovery. Also the capping protects the discharge apertures of the recording head, for example after a recording operation is terminated.

A blade 31, constituting a cleaning (wiping) member and composed for example of silicone rubber, is positioned at a side of the discharge recovery, device 26. The blade 31 is uniformly supported on both sides, with a cantilever mechanism, by a blade support member 31A, and is moved by a unrepresented motor and a transmission mechanism as in the discharge recovery device 26, thereby being capable of engaging with the ink discharging surface of the recording head 20. The blade 31 is made to protrude into the moving path of the recording head 20 at a suitable timing during the recording operation of the recording head 20 or after the discharge recovery operation by the recovery device 26, thereby wiping off the ink droplets, water droplets or other foreign matters on the ink discharge surface of the head 20 in the reciprocating motion thereof.

In the following there will be explained the wiping operation based on the above-explained structure.

FIG. 1A shows a case in which the recording head 20 moves in a direction A towards the home position after the recording operation, and the discharge recovery device 26 and the blade 31 are in a state retracted from the moving path of the recording head 20.

FIG. 1B shows a state in which the recording head 20 is stopped at the home position, and the capping member 26A of the discharge recovery device 26 engages with the ink discharging surface of the head 20, achieved by movement of said capping member 26A in direction B. The blade 31 moves with the head recovery device 26, but does not move with respect to the device 26.

FIG. 1C shows a case in which the recording head 20 moves in a direction D, from the home position to the recording start position, and the capping member 26A of the head recovery device 26 is retracted from the moving path of the recording head 20. On the other hand, the blade 31 moves in a direction C, with respect to the recovery device 26, thus protruding into the moving path of the recording head 20. Therefore, the ink discharging surface of the recording head 20 contacts the blade member 31 and is thus cleaned.

The wiping operation by the blade member 31 removes the dewing on the ink discharging surface or the wetting thereof generated by the ink bounced from the recording medium.

However, in such conventional structure, there are required complicated operations of causing the blade member to protrude in the moving path of the recording head and thereafter retracting said blade member, and complex mechanisms therefor.

Thus the German Laid-open Patent DE No. 3611666A1 proposes a method of fixing the blade in a protruding state in the moving path of the recording head at a predetermined position, for example in the vicinity of the home position, and achieving the cleaning operation by the movement of the recording head.

After having repeated the experiments with the ink jet recording employing the above-explained method, it was found that the recorded image was disturbed after prolonged use.

Further experiments revealed that this phenomenon was principally due to a change in the state of the ink discharging surface caused by the contact between said surface and the blade.

More specifically, the ink discharging surface of the recording head is usually subjected to a surface treatment for achieving uniform wettability for ink, namely water-repellent surface treatment for aqueous ink, or oil-repellent surface treatment for oily ink, thereby minimizing ink deposition on the ink discharging surface.

When this treated surface layer (ink-repellent treated) is deteriorated in function by the contact with the blade, there will result defective ink discharge, leading to disturbance in the image.

SUMMARY OF THE INVENTION

In consideration of the foregoing, it is an object of the present invention to provide an ink jet recording apparatus capable of minimizing the deterioration in the surface characteristic caused by the abrasion of the ink discharging surface resulting from the cleaning operation and simplifying the cleaning mechanism, by eliminating the protruding and retracting operations of the cleaning member.

It is another object of the present invention to provide an ink jet recording apparatus provided with a cleaning member for cleaning the vicinity of the ink discharging apertures of the recording head, and regulating means for varying the cleaning force of the cleaning member according to the direction of wiping.

It is still another object of the present invention to provide an ink jet recording apparatus capable of varying the wiping force on the ink discharging surface of the recording head according to the direction of wiping, thereby eliminating the dewing, wetting or dusts when wiping in a predetermined direction but effecting the wiping operation with a lower force in the other direction to avoid undesirable influence on the surface treatment layer of the ink discharging surface.

DETAILED DESCRIPTION OF THE PREFERRED EMBODIMENTS

Now the present invention will be clarified in detail by preferred embodiments thereof shown in the attached drawings. However, the present invention is not limited to such embodiments but is subject to variations as long as the objects of the present invention can be achieved.

(1st embodiment)

Figure 1A:
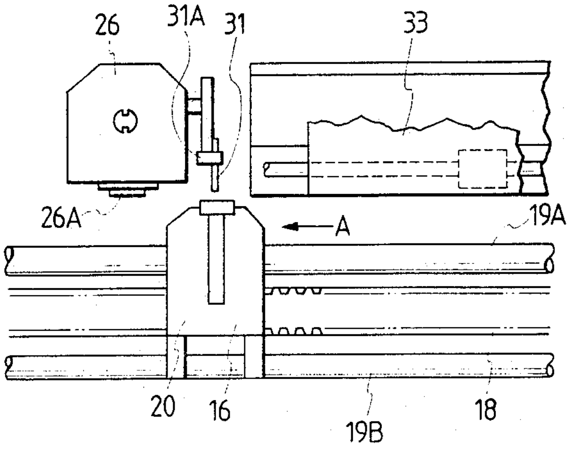
FIG. 1A PRIOR ART
FIGS. 1A to 1C are schematic plan views showing a cleaning operation with a conventional cleaning mechanism in an ink jet recording apparatus.
Figure 1B:
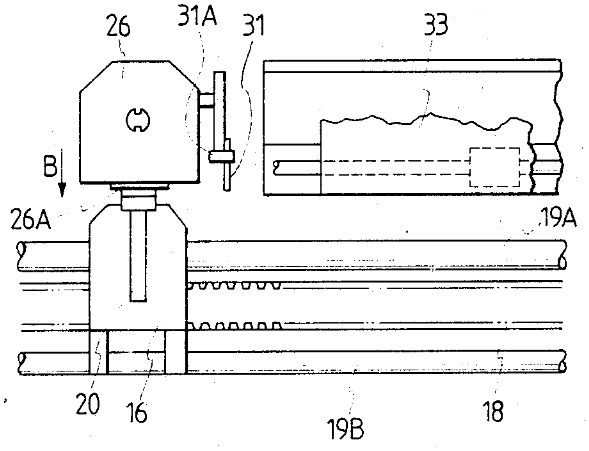
FIG. 1B PRIOR ART
Figure 1C:
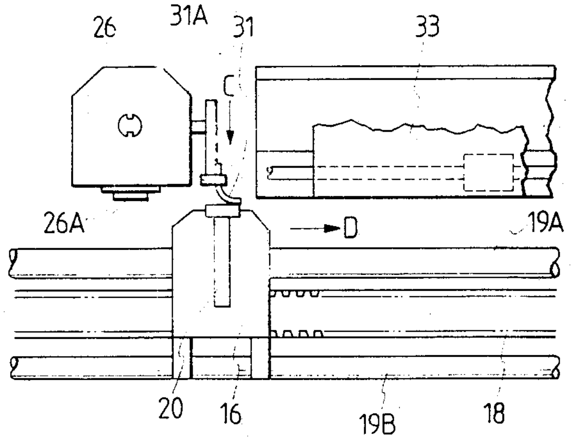
FIG. 1C PRIOR ART
Figure 2A:
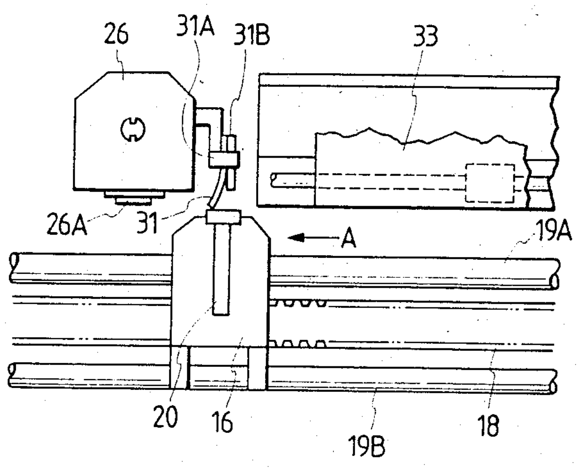
FIGS. 2A to 2C are schematic plan views showing a cleaning operation with a cleaning mechanism constituting a first embodiment of the present invention.
Figure 2B:
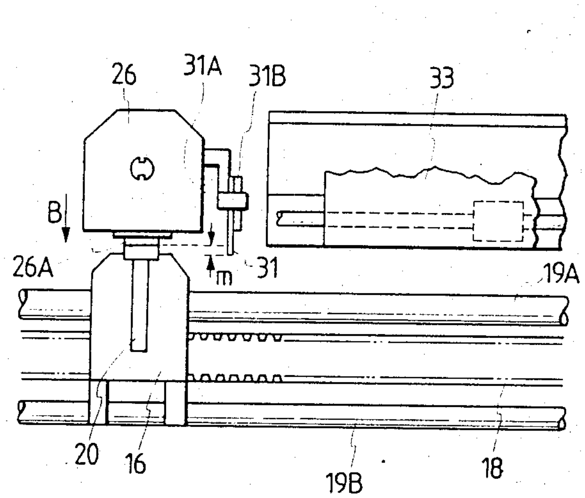
Figure 2C:
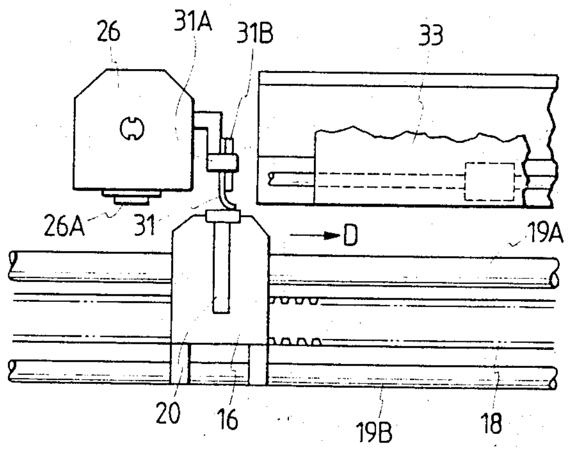

FIGS. 2A to 2C are plan views of an ink jet recording apparatus constituting a first embodiment of the present invention, showing cleaning operations similar to those shown in FIGS. 1A to 1C, wherein the same components as those shown in FIGS. 1A to 1C are represented by the same numbers and will not be explained further. FIGS. 3A–3C, 4A–4C and 5A–5C are also similar drawings.

In FIGS. 2A to 2C, the wiping means, which is one of the preferable cleaning means, is composed of a wiping blade 31 constituting a cleaning member, of which an end is pinched by a blade support member 31A and a blade length regulating member 31B and fixed in a cantilever structure. In said structure, the blade length regulating member 31B, composed for example of hard rubber, plastics or metal, is positioned on the side of the recording medium 33 with respect to the blade 31, and extends along the blade 31 to the middle thereof. Due to the presence of the wiping force regulating means, the length of the bendable arm of the blade 31 varies according to the direction of bending. In the present embodiment, the blade 31 composed of silicone rubber has a thickness 0.1 to 0.5 mm, and a protruding length X (from the blade support member 31A to the front end of the blade 31) of 5–10 mm, while the protruding amount Y (from the blade support member 31A to the front end of the regulating member) is 2–6 mm, with an overlapping length of the head and blade of 0.5 to 1.5 mm, but other suitable dimensional ranges may be adopted.

However, it is experimentally confirmed that the ratio Y/X is preferably equal to 0.2 or higher in consideration of the durability, more preferably in further consideration of 0.5 or higher, and most preferably 0.7 or higher. Also the upper limit of said ratio is preferably a value giving a large value of X - Y, preferably about 0.95, in consideration of the thickness of the blade.

The blade support member 31A is fixed to the head recovery device 26.

FIG. 2A shows a state in which the recording head 20 moves in a direction A toward the home position, for example after a recording operation. The capping member 26A of the head recovery device 26 is retracted from the moving path of the recording head 20, but the blade 31 fixedly protrudes in said moving path. Thus the ink discharging surface of the recording head 20 comes into contact with the wiping blade 31, but the contacting force is very weak, as the regulating member 31B does not function.

FIG. 2B shows a state in which the recording head 20 is stopped at the home position, and the capping member 26A of the head recovery device 26 effects a capping operation in contact with the ink discharging surface of the head 20, as the result of movement of said capping member 26A in a direction B.

FIG. 2C shows a case in which the recording head 20 moves from the home position to the recording start position, in a direction D, wherein the discharge recovery device 26 and the blade 31 are in the same positions as in FIG. 2A. Therefore, also in this movement, the ink discharging surface of the recording head 20 is wiped.

In this state the displacement of the blade 31 in the direction D is limited by the regulating member 31B to reinforce the elastic force of the blade 31, whereby the ink droplets, water droplets and other matters on the ink discharging surface can be securely removed.

In this manner, the wiping force in FIG. 2A is different from that in FIG. 2C, as the practical arm length of the blade 31 varies depending on the wiping direction. More specifically, the wiping force is weak in the movement toward the home position, but is strong enough for removing the dewing etc. in the movement toward the recording start position.

Such wiping operation is not limited to the reciprocating motion for the discharge recovery by the discharge recovery device 26, but may naturally be conducted in a reciprocating motion exclusive for such wiping, to be conducted at a predetermined timing, for example after continuous recording operation of a predetermined period.

(2nd embodiment)

Figure 3A:
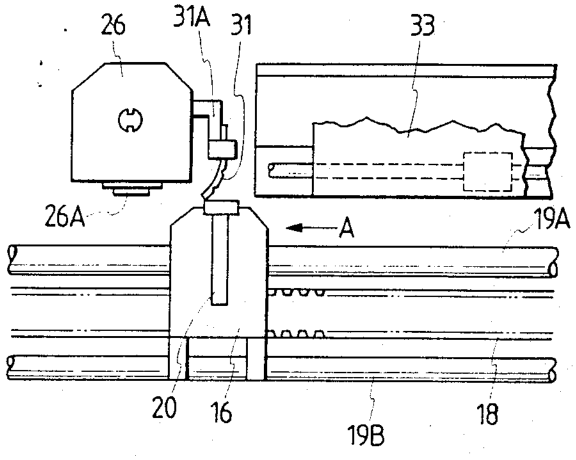
FIGS. 3A to 3C are schematic plan views showing a cleaning operation with a cleaning mechanism constituting a second embodiment of the present invention.
Figure 3B:
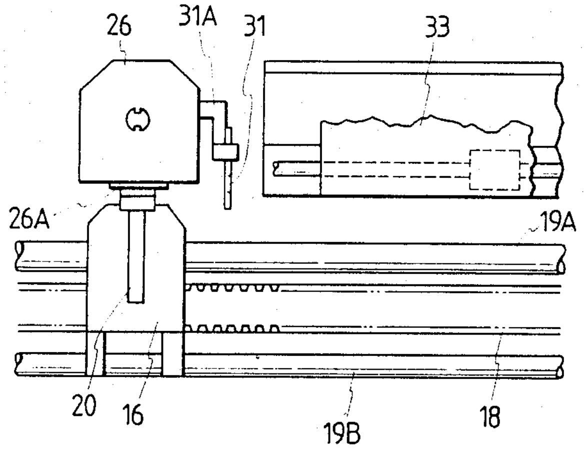
Figure 3C:
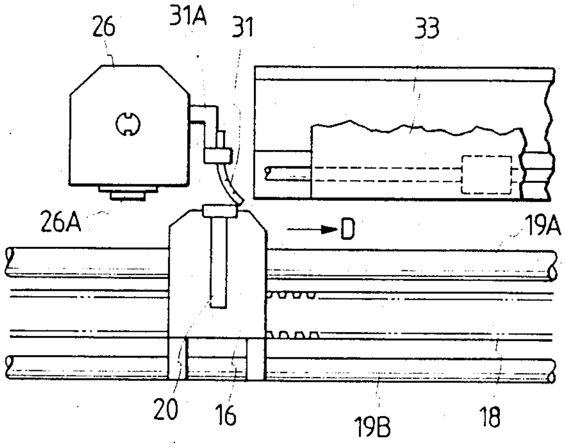

FIGS. 3A to 3C are plan views of an ink jet recording apparatus constituting a second embodiment of the present invention, wherein wiping means is employed as cleaning means as in FIGS. 1A to 1C.

In FIGS. 3A to 3C, a blade support member 31A is fixed to the head recovery device 26, and a blade 31 is supported by the blade support member 31A in a similar manner as in FIGS. 1A to 1C. The present embodiment is different from the structure shown in FIGS. 1A to 1C in that the blade 31 is provided with notches at the side closer to the recording medium 33, whereby the blade 31 has different bending rigidity according to the bending direction, thus being capable of regulating the wiping force.

FIGS. 3A to 3C show wiping operations respectively corresponding to those in FIGS. 1A to 1C, whereby the wiping force is weak in case of the movement of the recording head 20 toward the home position but is strong enough for removing the ink droplets, water droplets and other matters in the movement toward the recording start position.

In the present embodiment, the regulating means is composed of notches provided on the blade, but there may also be employed a blade having surface irregularities on one surface for showing different bending rigidity on both sides, or a blade composed of mutually adhered plural members of different elastic moduli.

(3rd embodiment)

Figure 4A:
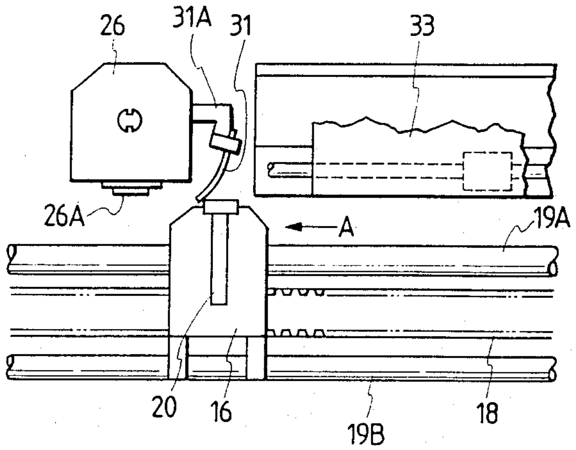
FIGS. 4A to 4C are schematic plan views showing a cleaning operation with a cleaning mechanism constituting a third embodiment of the present invention.
Figure 4B:
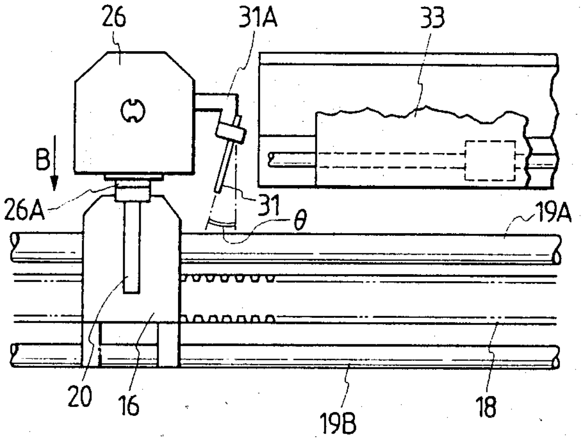
Figure 4C:
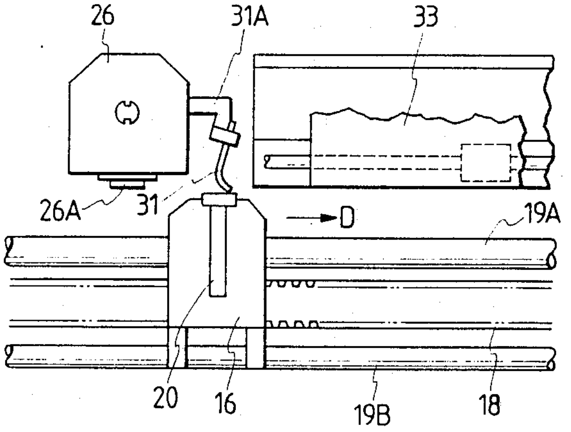

FIGS. 4A to 4C are plan views of an ink jet recording apparatus constituting a third embodiment of the present invention, employing wiping means as the cleaning means as in FIGS. 2A to 2C and 3A to 3C.

In FIGS. 4A to 4C, a blade support member 31A is fixed to the head recovery device 26, and a blade 31 is supported by the blade support member 31A in a similar manner as in FIGS. 1A to 1C. The blade support member 31A has an arm for supporting the blade 31, inclined toward the head recovery device 26. The angle $\theta$ of inclination can be suitably selected, and such regulating means for the wiping force causes the bending of the blade 31 to vary, in the wiping of the ink discharging surface of the recording head 20, depending on the wiping direction.

(4th embodiment)

Figure 5A:
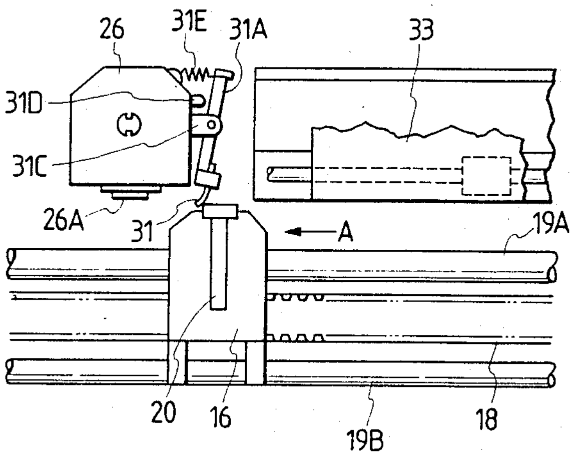
FIGS. 5A to 5C are schematic plan views showing a cleaning operation with a cleaning mechanism constituting a fourth embodiment of the present invention.
Figure 5B:
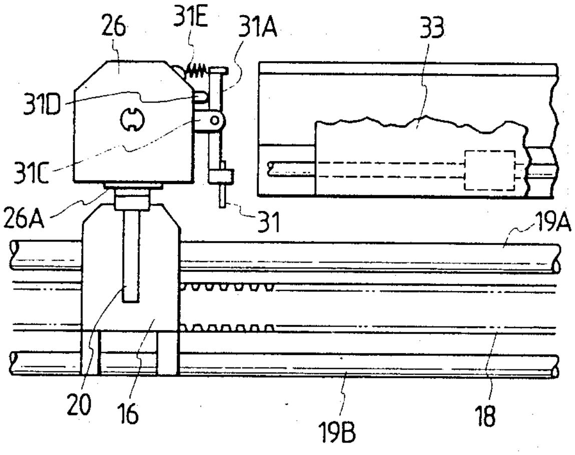
Figure 5C:
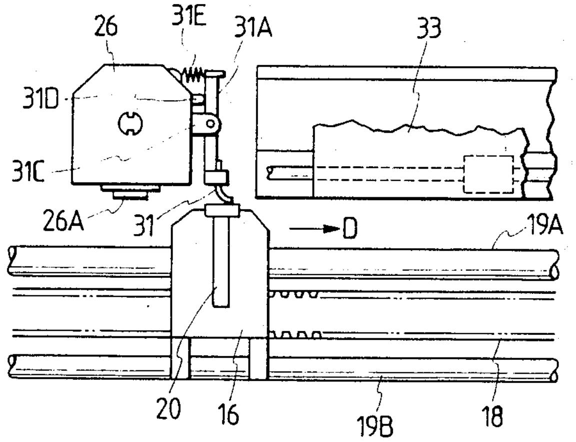

FIGS. 5A to 5C are plan views of an ink jet recording apparatus constituting a fourth embodiment of the present invention, employing wiping means as the cleaning means as in FIGS. 2A–2C, 3A–3C and 4A - 4C.

In FIGS. 5A to 5C, a blade support member 31A and its extention are rotatably supported, at the middle thereof, by a fulcrum member 31C fixed to the head recovery device 26. Also an end of said blade support member 31A, opposite to the end thereof supporting the blade 31, is connected to an end of a spring 31E of which the other end is connected to the head recovery device 26, whereby a part of the blade support member 31A engages with a stopper 31D fixed to the head recovery device 26. Thus, a state shown in FIG. 4B is realized when the blade 31 does not wipe the ink emitting surface. Such regulating means for the wiping force causes the wiping force of the blade 31 to vary depending on the direction of wiping.

In the structures shown in FIGS. 2A–2C, 3A–C, 4A–4C and 5A–5C, the wiping force is weak in the movement of the recording head 20 toward the home position, but is strong enough for removing dews and so on in the movement toward the recording start position.

In the foregoing embodiments, the recording medium is not smeared by the ink scattering, since the wiping operation in the movement from the recording position toward the home position is conducted with a weak force.

The position of the blade is not limited to that in the foregoing embodiments but may be suitably selected in the moving path of the recording head.

In the foregoing explanation there has been employed so-called blades constituting wiping means which is one example of cleaning means excellent in removing ink and other substances, but the present invention is not limited to such blades and is applicable to any means capable of cleaning the ink discharging surface. More specifically, the cleaning member may be composed of plural sheet-shaped blades or a brush-like member.

However, the structure employing a plateshaped elastic blade positioned corresponding to the direction of arrangement of the discharge apertures, as described above is preferable for excellent cleaning (wiping), and the regulating means is most effective for such a cleaning blade.

The regulating means for the wiping force in the present invention collectively includes means capable of varying the wiping force depending on the direction of wiping. Consequently it is not limited to means for controlling and varying the wiping force by respective structure, but is subject to various modifications within the scope of the present invention. Said regulating means in each embodiment can be designed in such a manner that the ratio of cleaning force in different moving directions of the recording head (ratio of smaller force to larger force) is equal to 0.2 or larger, preferably 0.5 or larger and more preferably 0.7 or larger.

The recording head to be employed in the ink jet recording apparatus of the present invention is preferably based on a method of image formation with ink, utilizing thermal energy generated by an electrothermal converting element for forming ink droplets, in consideration of ease of formation of a planar discharging surface and ease of cleaning even in an array of plural discharge apertures.

Such recording head, being compact, low in manufacturing cost and capable of providing high image quality, is preferably employed in a form having an ink tank containing ink and being detachable from the carriage.

As detailedly explained in the foregoing, the present invention varies the cleaning force on the ink discharging surface of the recording head depending on the direction of cleaning (relative movement of the recording head and the cleaning member), whereby the cleaning is conducted in a direction with a force enough for removing the dewing, wetting or dust but in the other direction with an extremely weak force.

Thus the apparatus can be simplified as the operation of causing the cleaning member to protrude in or retracting from the moving path of the recording head, and the mechanism therefor, can be dispensed with.

Also the abrasion of the ink discharging surface can be minimized since the contact between the cleaning member and the ink discharging surface is weak except in the removal of the ink droplets, water droplets caused by dewing or other foreign matter.

It is therefore possible to achieve enough cleaning with a simple structure, thereby providing stable recording quality.

What is claimed:

1. An ink jet recording apparatus comprising a recording head having a surface in which is provided a discharge port for discharging ink therethrough and cleaning means with a cleaning member capable of contacting said surface, in which cleaning of said surface is performed by the relative movement of said cleaning member and said recording head, wherein said cleaning means includes changing means for changing a cleaning force of said cleaning member against said surface in response to a direction of said relative movement when cleaning is performed.

2. An ink jet recording apparatus according to claim 1, wherein said discharge port is provided on a substantially planar portion of said recording head.

3. An ink jet recording apparatus according to claim 2, wherein said surface in the vicinity of said discharge port is treated with an ink-repellant liquid.

4. An ink jet recording apparatus according to claim 1, wherein said apparatus utilizes thermal energy for forming ink droplets and records an image with ink.

5. An ink-jet recording apparatus according to claim 1, wherein said recording head has an electro-thermal transducer for generating thermal energy.

6. An ink jet recording apparatus according to claim 1, wherein said recording head has an ink tank containing ink therein and is integrally and detachably loaded onto a carriage.

7. An ink jet recording apparatus according to claim 1, wherein said discharge port is disposed in said surface in the vicinity where said cleaning member cleans said surface.

8. An ink jet recording apparatus according to claim 1, wherein said cleaning member is a plate-like elastic member having a thickness of 0.1 to 0.5 mm and said changing means changes the length of a displaceable portion of said elastic member in accordance with a direction of movement of said recording head, the portion of said cleaning member displaceable when said recording head moves in one direction being 5.0 to 10.0 mm and the portion of said cleaning member displaceable when said recording head moves in another direction being 2.0 to 6.0 mm.

9. An ink jet recording apparatus comprising a recording head having a surface in which is provided a discharge port for discharging ink therethrough, a reciprocally movable carriage mounting said recording head, driving means for moving said carriage between a recording position and a non-recording position and a wiping blade provided in said non-recording position for wiping said surface, in which wiping of said surface is performed by moving said recording head with respect to said wiping blade, wherein said wiping blade has adjusting means for changing a contacting force of said wiping blade against said surface in response to a direction of said reciprocal movement of said carriage when wiping is performed.

10. An ink jet recording apparatus according to claim 9, wherein said adjusting means has a controlling member for controlling an amount of shift of said wiping blade in one direction, said controlling member being provided adjacent to a side of said wiping blade at a side of said recording position.

11. An ink jet recording apparatus according to claim 10, wherein said wiping blade includes a plate-like elastic member, the thickness of which is 0.1 to 0.5 mm and a projecting amount of which is 5.0 to 10.0 mm, wherein when the projecting amount of said elastic member is defined as X and a projecting amount of said controlling member along a projecting direction of said elastic member is defined as Y, Y/X is 0.2 to 0.6.

12. An ink jet recording apparatus according to claim 10, wherein said wiping blade includes a plate-like elastic member having a thickness of 0.1 to 0.5 mm and a projecting amount of 5.0 to 10.0 mm, wherein said controlling member projects along the projecting direction of said elastic member by 2.0 to 6.0 mm.

13. An ink jet recording apparatus according to claim 10, wherein a projecting amount of said wiping blade is defined as X, a projecting amount of said controlling member along a projecting direction of said wiping blade is defined as Y, and Y/X is not smaller than 0.2.

14. An ink jet recording apparatus according to claim 13, wherein Y/X is not smaller than 0.5.

15. An ink jet recording apparatus according to claim 13, wherein Y/X is not smaller than 0.7.

16. An ink jet recording apparatus according to claim 12, wherein said adjusting means includes a notch provided in said wiping blade.

17. An ink jet recording apparatus according to claim 12, wherein said adjusting means disposes a leading edge of said wiping blade inclinedly with respect to a direction of said recording position.

18. An ink jet recording apparatus according to claim 9, wherein said adjusting means holds said wiping blade for rotation and has a member for controlling a rotational range of said leading edge of said wiping blade in a direction of said recording position.

19. An ink jet recording apparatus according to claim 12, wherein said discharge port is provided on a substantially planar portion of said recording head.

20. An ink jet recording apparatus according to claim 19, wherein said surface in the vicinity of said discharge port is treated with an ink-repellant liquid.

21. An ink jet recording apparatus according to claim 12, wherein said apparatus utilizes thermal energy for forming ink droplets and records an image with ink.

22. An ink jet recording apparatus according to claim 12, wherein said recording head has an electrothermal transducer for generating thermal energy.

23. An ink jet recording apparatus according to claim 9, wherein said recording head has an ink tank containing ink therein and is integrally and detachably loaded onto said carriage.

24. An ink jet recording apparatus according to claim 9, wherein said wiping blade includes a plate-like elastic member, the thickness of which is 0.1 to 0.5 mm, and a projecting amount of which is 5.0 to 10.0 mm.

25. An ink jet recording apparatus according to claim 9, wherein said discharge port is disposed in said surface in the vicinity where said wiping member wipes said surface.

26. A cleaning unit for an ink jet recording apparatus, said unit comprising:

a cleaning member capable of contacting a surface of a recording head in which is provided a discharge port, said discharge port being disposed for discharging ink therethrough and said surface being cleaned by relative movement of said recording head and said cleaning member; and changing means for changing a cleaning force of said cleaning member against said surface in accordance with the moving direction of said cleaning member relative to said recording head when cleaning is performed.

27. A cleaning unit according to claim 26, wherein said wiping blade is a plate-like elastic member having a thickness of 0.1 to 0.5 mm and said changing means changes the length of a displaceable portion of said elastic member in accordance with a direction of movement of said recording head, the portion of said cleaning means displaceable when said cleaning member moves in one direction being 5.0 to 10.0 mm and the portion of said cleaning means displaceable when said cleaning member moves in another direction being 2.0 to 6.0 mm.

28. A cleaning unit according to claim 8, wherein said cleaning member includes a plate-like elastic member.

29. A cleaning unit according to claim 28, wherein said changing means varies the length of a shiftable portion of said elastic member in response to a direction of said movement.

30. A cleaning unit according to claim 28, wherein said changing means includes a notch provided in said elastic member.

31. A cleaning unit according to claim 28, wherein said changing means disposes said elastic member inclinedly with respect to said direction of said movement.

32. A cleaning unit according to claim 28, wherein said changing means holds said elastic member for rotation and has a member for controlling one direction of said rotation.

* * * * *

UNITED STATES PATENT AND TRADEMARK OFFICE
CERTIFICATE OF CORRECTION

PATENT NO. : 4,959,673
DATED : September 25, 1990
INVENTOR(S) : ATSUSHI NODA

It is certified that error appears in the above-identified patent and that said Letters Patent is hereby corrected as shown below:

COLUMN 1

Line 15, "a" should read --an--.
Line 24, "the" should be deleted and "from recording" should read --from the recording--.
Line 45, ",means" should read --means--.

COLUMN 2

Line 8, "recovery," should read --recovery--.
Line 11, "a" (first occurrence) should read --an--.
Line 64, "recording" should read --recording apparatus--.

COLUMN 5

Line 63, "extention" should read --extension--.

COLUMN 6

Line 29, "plateshaped" should read --plate-shaped--.
Line 32, "above is" should read --above, is--.

COLUMN 7

Line 3, "tracting" should read --tract--.

COLUMN 8

Line 34, "12," should read --9,--.
Line 37, "12," should read --9,--.
Line 46, "12," should read --9,--.
Line 52, "12," should read --9,--.
Line 55, "12," should read --9,--.

UNITED STATES PATENT AND TRADEMARK OFFICE

CERTIFICATE OF CORRECTION

PATENT NO. : 4,959,673

DATED : September 25, 1990

INVENTOR(S) : ATSUSHI NODA

It is certified that error appears in the above-identified patent and that said Letters Patent is hereby corrected as shown below:

COLUMN 9

Line 15, "wiping blade" should read --cleaning member--.

COLUMN 10

Line 3, "8," should read --26,--.

Signed and Sealed this

Twenty-fifth Day of February, 1992

*Attest:*

HARRY F. MANBECK, JR.

*Attesting Officer*

*Commissioner of Patents and Trademarks*